Dec. 7, 1971   C. B. HARRISON   3,624,842
ANTI-SWEAT ATTACHMENT FOR TOILETS
Filed May 18, 1970

INVENTOR.
CLARENCE B. HARRISON

United States Patent Office 3,624,842
Patented Dec. 7, 1971

3,624,842
ANTI-SWEAT ATTACHMENT FOR TOILETS
Clarence B. Harrison, 6148 E. Court St.,
Davison, Mich. 48422
Filed May 18, 1970, Ser. No. 38,333
Int. Cl. A47k 17/00; E03d 1/20
U.S. Cl. 4—1
5 Claims

ABSTRACT OF THE DISCLOSURE

A device for preventing the sweating of toilet tanks and the like. This device includes a spiral convoluted chamber for mixing hot water with the cold water in the toilet tank closet. The device is of such construction as to be adaptable for the interior or exterior of the toilet tank closet.

---

This invention relates to liquid mixing devices, and more particularly to a hot and cold water circulation device.

It is therefore the primary purpose of this invention to provide an anti-sweat prevention device for toilets and the like.

Another object of this invention is to provide a device of the type described which will consist of a mixing chamber having a spiral convoluted housing which may be mounted internally or externally of a water tank closet.

Another object of this invention is to provide an anti-sweat device which will have threaded sleeve means with an aperture for conducting hot water into the mixing chamber and will have control valve means to regulate the amount of hot water flowing into the device.

A further object of this invention is to provide an anti-sweat device which, due to the mixing of the hot water with the cold water of the tank closet, will prevent the condensation normally found on toilets and the like.

Other objects of the invention are to provide an anti-sweat device for toilets which is simple in design, inexpensive to manufacture, rugged in construction, easy to use and efficient in operation.

These and other objects will be readily evident upon a study of the following specification and the accompanying drawing, wherein.

Figure 1:
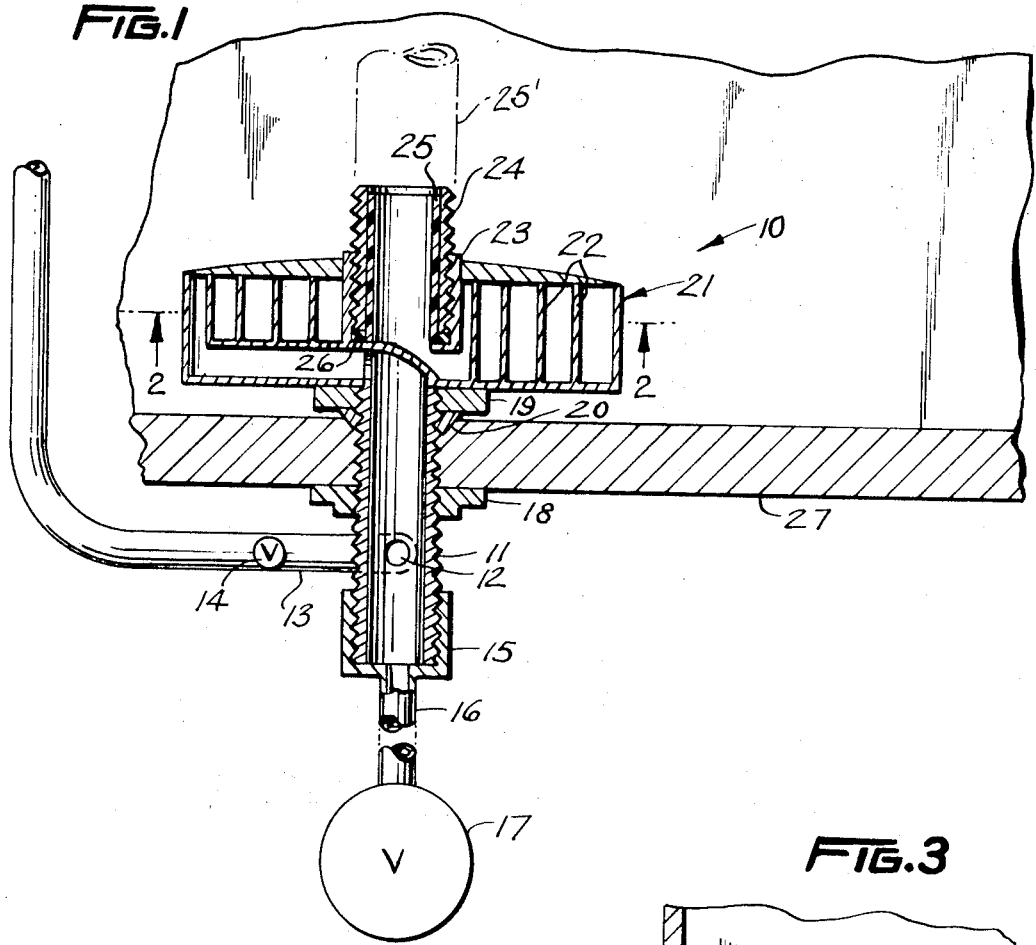
FIG. 1 is a vertical view of the present invention shown secured to the interior of a toilet water closet, the device being shown in cross section with the water closet shown in fragmentation.
Figure 2:
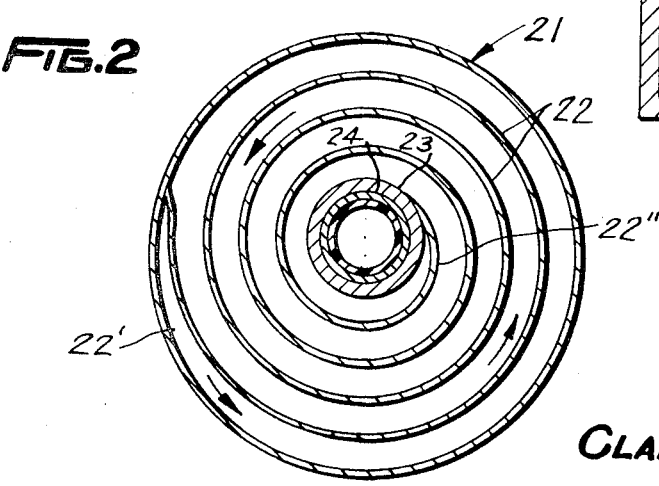
FIG. 2 is a transverse view taken along the lines 2—2 of FIG. 1.

According to this invention, an anti-sweat device 10 for toilets is shown to include an externally threaded sleeve 11 having an opening 12 for the introduction of hot water from pipe 13. A control valve 14 is secured to pipe 13 and provides a means of controlling the flow of hot water through pipe 13. A coupling 15 of cold water supply pipe 16 is threaded onto sleeve 11 and a valve 17 controls the flow of the cold water passing through pipe 16. A lock nut 18 is threaded onto sleeve 11 and is spaced apart from a similar lock nut 19 which abuts with a frusto-conical washer 20 for a purpose which hereinafter will be described. A circular housing 21 providing circulation means for device 10 includes spiral convoluted walls 22 in order to allow for ample water travel from area 22' to area 22''. Extending from housing 21 is an internally threaded sleeve portion 23 which threadingly receives an externally threaded sleeve 24 in which is received a protective sleeve 25 for the plastic filler valve 25'. A seal between externally threaded sleeve 24 and the bottom of sleeve portion 23 is provided for by means of a rubber or plastic gasket 26.

Figure 3:
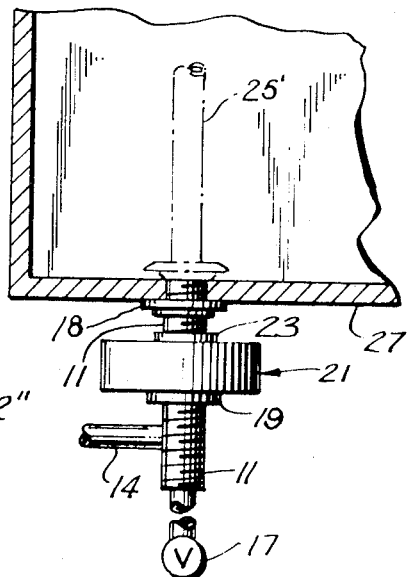
FIG. 3 is a view similar to FIG. 1, but showing the device mounted externally of the water tank closet.

It shall be noted that the housing 21 having the spiral convoluted walls 22 is mounted on the interior of water closet 27 as shown in FIG. 1 or is mounted externally as shown in FIG. 3 of the drawing.

As will be seen in FIG. 1 of the drawing, lock nut 18 in conjunction with frusto-conical washer 20 and lock nut 19 serve to secure device 10 securedly to water closet 27.

In use, cold water enters device 10 by means of the cold water supply pipe 16 and the hot water pipe 13 supplies hot water through the opening 12 of sleeve 11 and the water travels into the housing 21 wherein the spiral convoluted walls 22 allow ample travelling and mixing of the two and thus prevents water condensation on the exterior of the toilet.

It shall further be noted that anti-sweat device 10 may be adaptable to apparatus other than toilets to provide the heretofore before mentioned function.

What I now claim is:

1. An anti-sweat apparatus for toilets and the like, comprising an externally threaded sleeve, locking means carried by said sleeve for mounting said apparatus to a water closet, pipe means carried by said sleeve for introducing hot water into the cold water entering said water closet, said pipe means comprising a hot water pipe connected to an aperture on a side of said sleeve, a spiral convoluted wall housing carried by said sleeve providing circulatory mixing means for the hot and cold water in order to prevent said water closet from sweating, an externally threaded sleeve portion with gasket means carried by said apparatus providing sealing means for the outer portion of said housing and protective sleeve means carried on the interior of said apparatus.

2. The combination according to claim 1, wherein said externally threaded sleeve means carried by said apparatus is secured by lock nut means to the bottom wall of said water closet and a frusto-conical washer is carried by said sleeve to aid in sealing said device watertight to said water closet, one of the lock nuts of said apparatus abutting with said housing forming said mixing chamber and abutting also with said frusto-conical washer, said housing being spaced apart from the bottom wall of said water closet.

3. The combination according to claim 2, wherein aperture means through said externally threaded sleeve carrying said cold water and said hot water allows for the passage of hot water from an external pipe which includes control valve means for controlling the amount of water flow into said aperture of said sleeve and said water travels upwards and out of similar aperture means through the upper portion of said sleeve of said housing wherein said water is circulated in a spiral motion through said housing by means of said spiral convoluted walls of said housing and said water is then exited into said water closet in order to prevent said closet from sweating by the temperature of said water preventing condensation of water vapor on the surfaces of said water closet.

4. The combination according to claim 3, wherein said anti-sweat apparatus is also adaptable for external mounting upon said water closet and said apparatus includes said housing having said spiral convoluted walls, the device being threaded onto said sleeve beneath the bottom wall of said closet, said locking nuts securing said apparatus firmly within the opening of said bottom wall of said water closet.

5. The combination as set forth in claim 4 wherein said apparatus includes a mixing chamber in which water is circulated in a spiral path by means of said convoluted wall of said housing, one portion of said housing said convoluted wall extending from top to bottom while a portion of said convoluted wall extends from the top and partially to the bottom, said bottom portion forming pathway means from said aperture in said sleeve, said sleeve having an end wall baffle for directing said water out of said aperture and into said housing.

References Cited

UNITED STATES PATENTS

| | | | |
|---|---|---|---|
| 2,527,115 | 10/1950 | Bosworth | 4—18 X |
| 2,895,140 | 7/1959 | Starr | 4—18 |
| 2,900,645 | 8/1959 | Rom | 4—18 |
| 3,023,423 | 3/1962 | Jones | 4—18 |

HENRY K. ARTIS, Primary Examiner

U.S. Cl. X.R.

4—18